(12) United States Patent
Horng

(10) Patent No.: US 9,219,386 B2
(45) Date of Patent: Dec. 22, 2015

(54) MOTOR'S STATOR UNIT

(71) Applicant: Sunonwealth Electric Machine Industry Co., Ltd., Kaohsiung (TW)

(72) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 267 days.

(21) Appl. No.: 13/914,682

(22) Filed: Jun. 11, 2013

(65) Prior Publication Data

US 2014/0015371 A1    Jan. 16, 2014

(30) Foreign Application Priority Data

Jul. 10, 2012    (TW) ............................... 101124815 A
Apr. 10, 2013    (TW) ............................... 102112749 A

(51) Int. Cl.
| | | |
|---|---|---|
| H02K 5/16 | (2006.01) | |
| H02K 1/18 | (2006.01) | |
| H02K 7/14 | (2006.01) | |
| H02K 3/52 | (2006.01) | |
| H02K 5/167 | (2006.01) | |

(52) U.S. Cl.
CPC ................ *H02K 1/187* (2013.01); *H02K 3/522* (2013.01); *H02K 5/1675* (2013.01); *H02K 7/14* (2013.01); *H02K 2203/12* (2013.01)

(58) Field of Classification Search
CPC .................................. H02K 7/14; H02K 1/187
USPC .................................... 310/67 R, 90; 417/354
See application file for complete search history.

(56) References Cited

U.S. PATENT DOCUMENTS

| | | | |
|---|---|---|---|
| 5,663,604 A | | 9/1997 | Takahashi |
| 5,798,887 A | * | 8/1998 | Yoshida et al. ............. 360/99.08 |
| 6,654,213 B2 | * | 11/2003 | Horng et al. ..................... 361/23 |
| 6,700,257 B2 | | 3/2004 | Lin |
| 7,737,589 B2 | | 6/2010 | Sekiguchi et al. |
| 7,837,391 B2 | | 11/2010 | Kitamura et al. |
| 2005/0200211 A1 | | 9/2005 | Hsu et al. |
| 2006/0186744 A1 | * | 8/2006 | Hsu et al. ..................... 310/67 R |
| 2007/0065064 A1 | * | 3/2007 | Kitamura et al. ............. 384/537 |
| 2007/0252451 A1 | | 11/2007 | Shibuya et al. |
| 2008/0157634 A1 | * | 7/2008 | Sekiguchi et al. .......... 310/67 R |

FOREIGN PATENT DOCUMENTS

| | | |
|---|---|---|
| TW | M284196 U | 12/2005 |
| TW | 201041279 A | 11/2010 |
| TW | 201210178 A | 3/2012 |

\* cited by examiner

*Primary Examiner* — Hanh Nguyen
(74) *Attorney, Agent, or Firm* — Alan D. Kamrath; Kamrath IP Lawfirm, P.A.

(57) ABSTRACT

A motor's stator unit includes a base and a stator. The base has a shaft tube. The stator has a silicon steel plate unit, an insulation sleeve unit and a coil unit. The silicon steel plate unit has an inner circumferential wall forming a through-hole. The insulation sleeve unit has an engagement hole. The silicon steel plate unit and the insulation sleeve unit are stacked together. The through-hole and the engagement hole are aligned with each other to allow the shaft tube to extend through the through-hole and the engagement hole. An enameled copper wire is wound around a predetermined part of the insulation sleeve unit to form the coil unit. The insulation sleeve unit is press fitted around an outer circumferential wall of the shaft tube via at least one buffering member, so as to prevent the silicon steel plate unit from excessively compressing the shaft tube.

20 Claims, 12 Drawing Sheets

MOTOR'S STATOR UNIT

BACKGROUND OF THE INVENTION

1. Field of the Invention

The present invention generally relates to a motor's stator unit and, more particularly, to a motor's stator unit that can be coupled with a rotor or an impeller to construct a motor or a cooling fan.

2. Description of the Related Art

Conventionally, a motor or a cooling fan includes a base. A shaft tube is arranged on a center of the base. At least one bearing is installed in the shaft tube, so that a rotor is able to rotatably couple with the bearing. The conventional motor or the cooling fan further includes a stator having a silicon steel plate unit that is press fit around the shaft tube to prevent the stator from disengaging from the shaft tube.

Since the silicon steel plate unit is made of metal material, the silicon steel plate unit may excessively compress the shaft tube when fit around the shaft tube by press fitting. This may cause deformation of the shaft tube. The deformed shaft tube may further compress the bearing and therefore result in damage to or deformation of the bearing. As a result, the service life of the motor or the cooling fan is shortened.

Referring to FIG. 1, a modified fixed bearing structure of a DC fan is disclosed by Taiwan Patent No. 519259. The conventional fixed bearing structure 7 includes a base 71 and a shaft seat 72 arranged on a center of the base 71. The shaft seat 72 has an annular groove 721. The upper part of the shaft seat 72 is separated into an inner annular wall 722 and an outer annular wall 723 by the annular groove 721. A stator unit 73 is press fit around the outer annular wall 723. A retaining ring 74 is installed in the annular groove 721 to support the stator unit 73 and to prevent the disengagement of the stator unit 73.

In the modified fixed bearing structure described above, the structure is of high complexity due to the formation process of the inner and outer annular walls 722, 723 and the installation process of the retaining ring 74, resulting in an inconvenient assembly.

Referring to FIG. 2, Taiwan Patent No. M284196 discloses a conventional cooling fan 8 comprising a fan frame 81, a bearing 82 and a stator 83. A central column 811 is arranged on a center of the fan frame 81. The bearing 82 is received in the central column 811. Threads 812 are arranged on upper and lower parts of an outer circumferential wall of the central column 811. The stator 83 may be fit around the central column 811. The stator 83 includes an upper insulation sleeve 831 screwed to the thread 812 on the upper part of the central column 811, as well as an lower insulation sleeve 832 screwed to the thread 812 on the lower part of the central column 811. This structure provides enhanced coupling between the stator 83 and the central column 811.

Disadvantageously, not only does it require forming the threads 812 on the upper and lower parts of the outer circumferential wall of the central column 811, but it also requires forming another two threads on inner circumferential walls of the upper insulation sleeve 831 and the lower insulation sleeve 832 that can be engaged with the threads 812 of the central column 811. As a result, it is inconvenient to manufacture the cooling fan. In addition, it is also required to screw the upper insulation sleeve 831 and the lower insulation sleeve 832 to the central column 811, leading to an inconvenient assembly.

FIG. 3 shows a spindle motor 9 disclosed by Taiwan Patent No. I258912 entitled "SPINDLE MOTOR AND STATOR STRUCTURE THEREOF". The spindle motor 9 is comprised of a stator 91 and a rotor 92. The stator 91 includes a seat 911, a magnetic-inducing structure 912 surrounding the seat 911, as well as a buffering structure 913 connected between the seat 911 and the magnetic-inducing structure 912.

In the structure of FIG. 3, the buffering structure 913 is located between the seat 911 and the magnetic-inducing structure 912. However, although the magnetic-inducing structure 912 is connected to the seat 911 via the buffering structure 913, the magnetic-inducing structure 912 is liable to compress the seat 911 via the buffering structure 913 since the magnetic-inducing structure 912 is made of metal material. As a result, the seat 911 can become deformed, shortening the service life of the spindle motor 9.

SUMMARY OF THE INVENTION

It is therefore the objective of this invention to provide a motor's stator unit that allows for easy assembly of the stator based on the simplified structure.

It is another objective of this invention to provide a motor's stator unit capable of preventing the shaft tube from being excessively compressed by the stator after assembly, preventing the malfunction of the motor or preventing the motor from generating noise due to the damaged bearing.

In a preferred embodiment, a motor's stator unit comprising a base and a stator is disclosed. The base has a shaft tube. The stator has a silicon steel plate unit, an insulation sleeve unit and a coil unit. The silicon steel plate unit has an inner circumferential wall forming a through-hole. The insulation sleeve unit has an engagement hole. The silicon steel plate unit and the insulation sleeve unit are stacked. The through-hole and the engagement hole are aligned with each other to allow the shaft tube to extend through the through-hole and the engagement hole. An enameled copper wire is wound around a predetermined part of the insulation sleeve unit to form the coil unit. The insulation sleeve unit of the stator is press fit around an outer circumferential wall of the shaft tube via at least one buffering member.

In a preferred form shown, the at least one buffering member is arranged between the insulation sleeve unit and the silicon steel plate unit.

In the preferred form shown, the insulation sleeve unit comprises an upper insulation sleeve and a lower insulation sleeve. The silicon steel plate unit is sandwiched between the upper and lower insulation sleeves. The at least one buffering member includes a single buffering member arranged between the upper insulation sleeve of the insulation sleeve unit and the silicon steel plate unit, or between the lower insulation sleeve of the insulation sleeve unit and the silicon steel plate unit.

In another preferred form shown, the insulation sleeve unit comprises an upper insulation sleeve and a lower insulation sleeve. The silicon steel plate unit is sandwiched between the upper and lower insulation sleeves. The at least one buffering member includes first and second buffering members. The first buffering member is arranged between the upper insulation sleeve of the insulation sleeve unit and the silicon steel plate unit, and the second buffering member is arranged between the lower insulation sleeve of the insulation sleeve unit and the silicon steel plate unit.

In the preferred form shown, the insulation sleeve unit has at least one protrusion corresponding to the at least one buffering member and extending towards the shaft tube in a radial direction. Each of the at least one buffering member is arranged between a respective one of the at least one protrusion and the silicon steel plate unit.

In the preferred form shown, the at least one buffering member is arranged between the insulation sleeve unit and the shaft tube.

In the preferred form shown, the insulation sleeve unit comprises an upper insulation sleeve and a lower insulation sleeve. The silicon steel plate unit is sandwiched between the upper and lower insulation sleeves. The at least one buffering member includes a single buffering member arranged between the upper insulation sleeve of the insulation sleeve unit and the shaft tube, or between the lower insulation sleeve of the insulation sleeve unit and the shaft tube.

In the preferred form shown, the insulation sleeve unit comprises an upper insulation sleeve and a lower insulation sleeve. The silicon steel plate unit is sandwiched between the upper and lower insulation sleeves.

The at least one buffering member includes first and second buffering members. The first buffering member is arranged between the upper insulation sleeve of the insulation sleeve unit and the shaft tube, and the second buffering member is arranged between the lower insulation sleeve of the insulation sleeve unit and the shaft tube.

In another preferred form shown, the shaft tube is coupled with a positioning ring positioning one of the at least one buffering member. The one of the at least one buffering member is sandwiched between the positioning ring and the silicon steel plate unit.

In the other preferred form shown, the positioning ring is fit around the shaft tube by press fitting.

In yet another preferred form shown, the shaft tube has an opening end, the shaft tube forms an expansion portion at the opening end thereof, and the expansion portion positions one of the at least one buffering member.

In still another preferred form shown, the shaft tube has an opening end, the shaft tube comprises an engagement portion at the opening end thereof, and the engagement portion is engaged with one of the at least one buffering member.

In the other preferred form shown, the engagement portion is in the form of an engaging protrusion integrally formed at the opening end of the shaft tube, and the engaging protrusion positions the one of the at least one buffering member.

In still another preferred form shown, the insulation sleeve unit comprises an upper insulation sleeve and a lower insulation sleeve. The silicon steel plate unit is sandwiched between the upper and lower insulation sleeves. A restraining protrusion is formed on the outer circumferential wall of the shaft tube. A positioning groove is formed on an inner circumferential wall of the lower insulation sleeve. The restraining protrusion is engaged in the positioning groove.

In still another preferred form shown, a positioning shoulder is arranged on the outer circumferential wall of the shaft tube, and the stator is positioned on the positioning shoulder.

In the other preferred form shown, the lower insulation sleeve of the insulation sleeve unit is positioned on the positioning shoulder In the preferred form shown, the outer circumferential wall of the shaft tube is spaced from the inner circumferential wall of the silicon steel plate unit by a gap.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
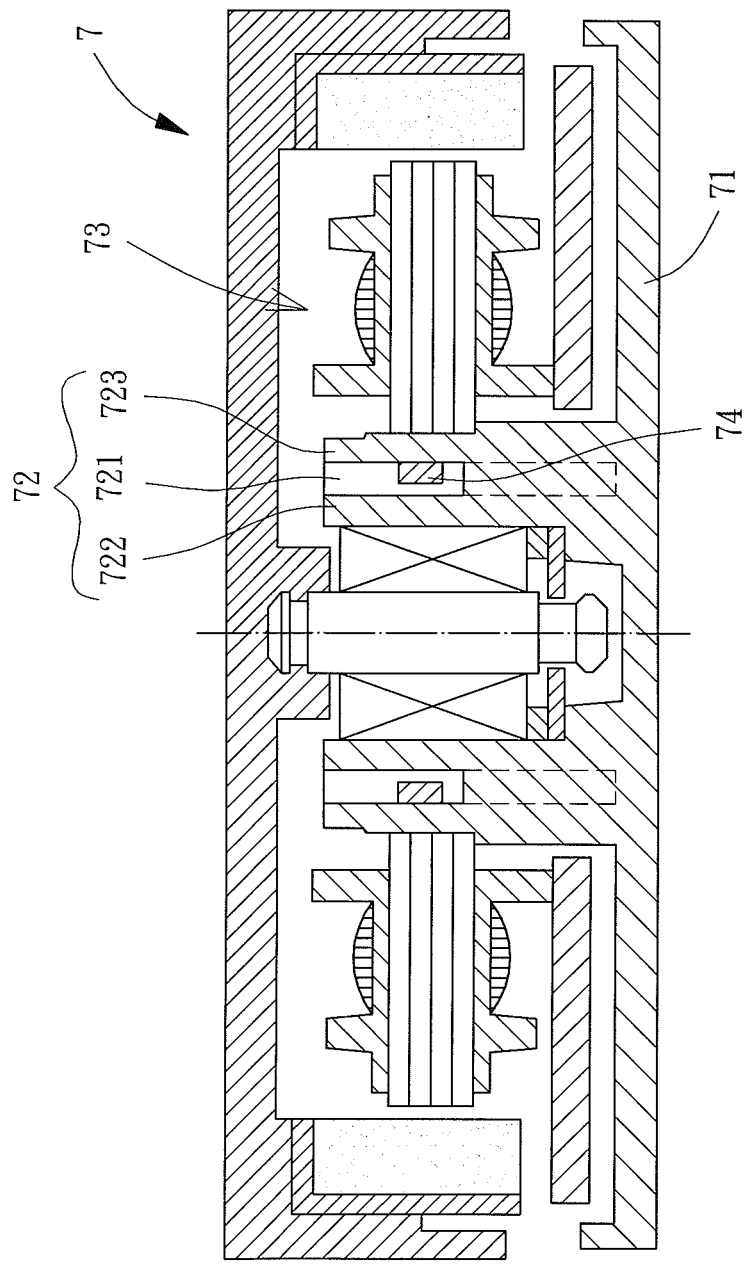
FIG. 1 is a cross-sectional view of a modified conventional fixed bearing structure of a DC fan.
Figure 2:
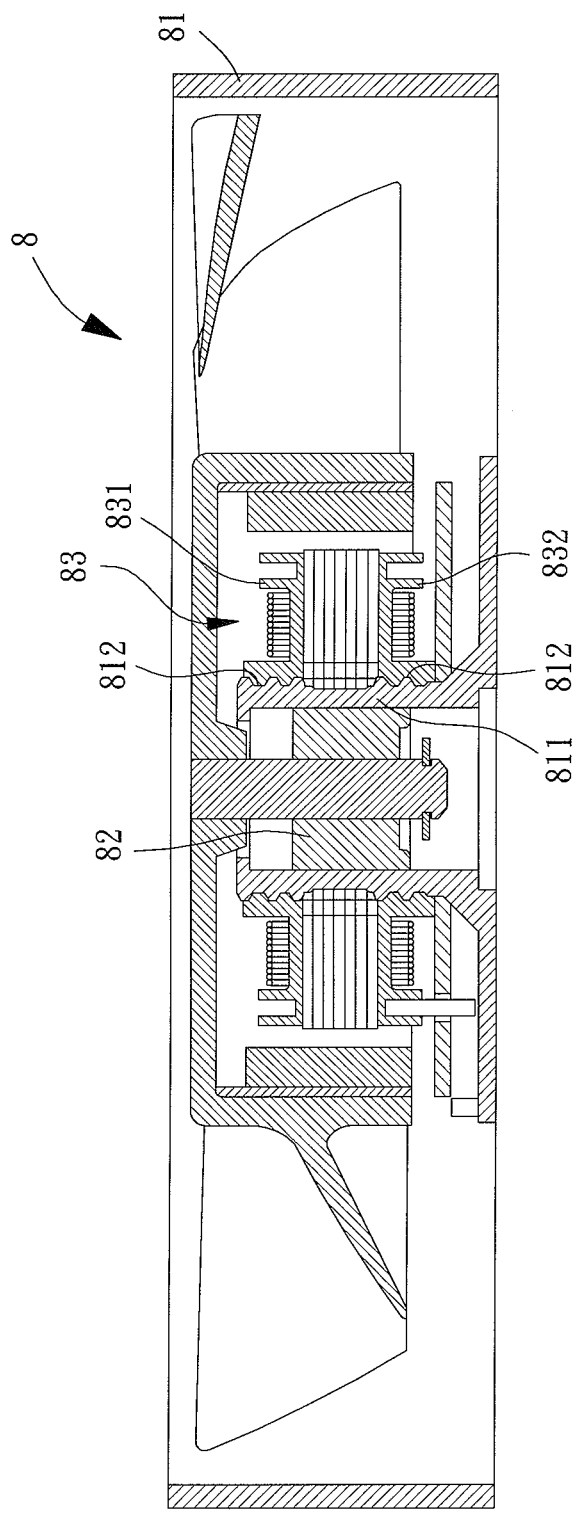
FIG. 2 is a cross-sectional view of a conventional cooling fan.
Figure 3:
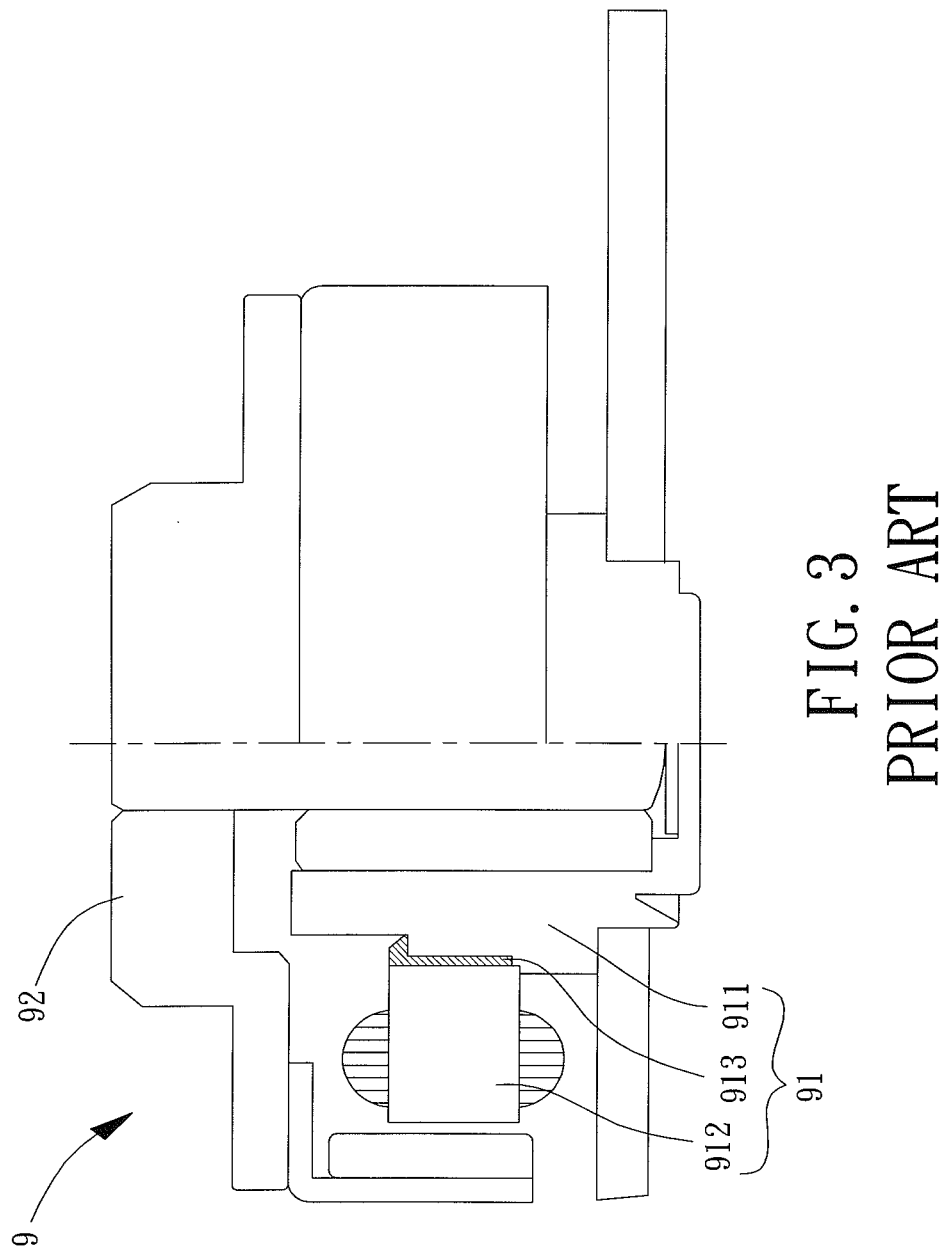
FIG. 3 is a cross-sectional view of a conventional spindle motor.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 4:
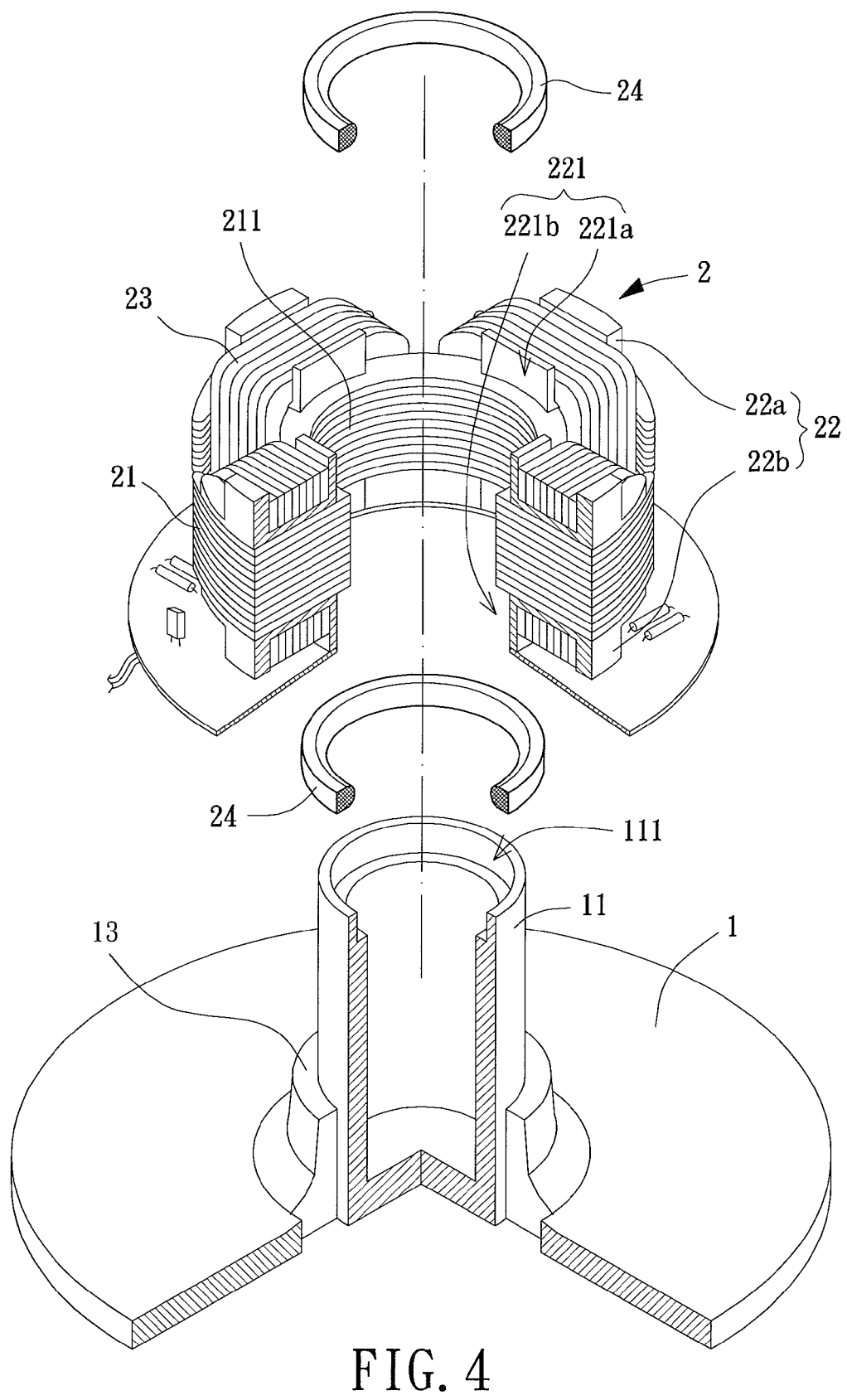
FIG. 4 is an exploded view of a motor's stator unit according to a preferred embodiment of the invention.

Referring to FIG. 4, a motor's stator unit is disclosed according to a preferred embodiment of the invention. The motor's stator unit includes a base 1 and a stator 2 that can be mounted on the base 1.

The base 1 includes a hollow shaft tube 11 (which can be made of plastic or metal material) that can receive an inner assembly. The shaft tube 11 may be mounted on or integrally formed with the base 1. The inner assembly may consist of a plurality of components that can be installed in the shaft tube 11 and can provide a variety of functions, such as a bearing, a wear-resisting plate, an engaging ring, a positioning ring, etc. However, the inner assembly includes at least the bearing. In addition, the shaft tube 11 includes an opening end 111 at a top of the shaft tube 11, as shown in FIG. 4.

Figure 5:
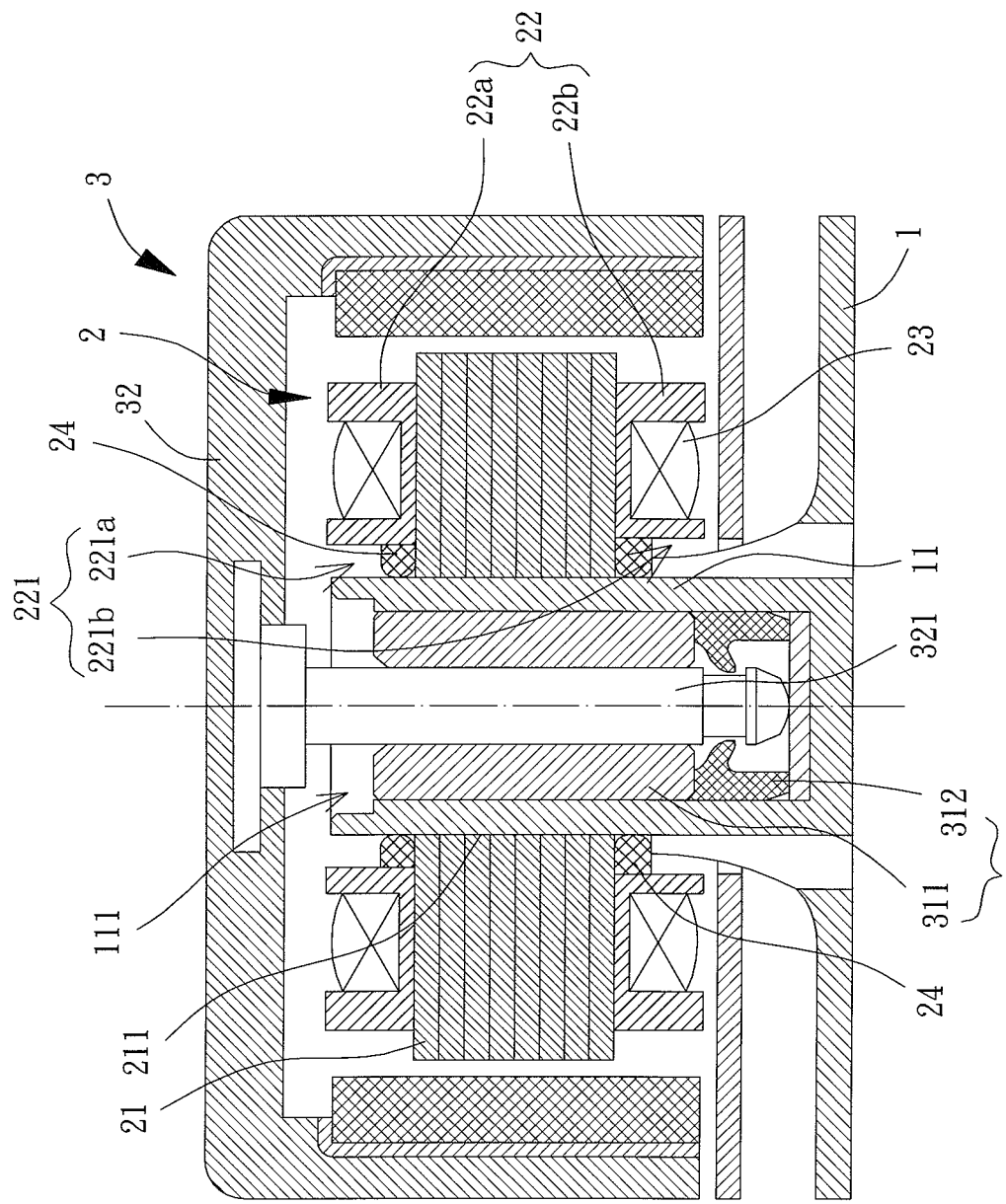
FIG. 5 is a cross-sectional view of a motor equipped with the stator unit of the preferred embodiment of the invention.

The stator 2 is coupled with the shaft tube 11 of the base 1. The stator 2 may be of any structure capable of driving a rotor 32 to rotate, as shown in FIG. 5. In this embodiment, the stator 2 may include a silicon steel plate unit 21, an insulation sleeve unit 22 and a coil unit 23. The silicon steel plate unit 21 includes an inner circumferential wall forming a through-hole 211. The insulation sleeve unit 22 includes an inner circumferential wall forming an engagement hole 221. The silicon steel plate unit 21 and the insulation sleeve unit 22 may be stacked together to align the through-hole 211 with the engagement hole 221. In this manner, the assembled silicon plate and insulation seat units 21 and 22 can be fit around the shaft tube 11. The silicon steel plate unit 21 may be coupled with the insulation sleeve unit 22, or may be formed with the insulation sleeve unit 22 as an integral injection molding. An enameled copper wire is wound around a predetermined part of the insulation sleeve unit 22 to form the coil unit 23.

In the preferred embodiment, the insulation sleeve unit 22 includes an upper insulation sleeve 22a and a lower insulation sleeve 22b. Based on this, the engagement hole 221 of the insulation sleeve unit 22 may include a first engagement hole 221a corresponding to the upper insulation sleeve 22a, as well as a second engagement hole 221b corresponding to the lower insulation sleeve 22b. In this structure, the silicon steel plate unit 21 may be securely sandwiched between the upper insulation sleeve 22a and the lower insulation sleeve 22b, achieving an improved positioning effect of the silicon steel plate unit 21.

When the motor's stator unit in the embodiment is in use, as shown in FIG. 5, an inner assembly 31 (which may comprise a bearing 311 and an engaging ring 312) may be installed in the shaft tube 11. The bearing 311 may be coupled with a shaft 321 of a rotor 32 to construct a motor 3. Thus, the stator 2 may be electrified to drive the rotor 32 to rotate. In addition, the motor's stator unit may serve as a fan frame and the rotor 32 may serve as an impeller, to construct a cooling fan (not shown). The detailed structure and operation of the motor 3 (or cooling fan) is not described herein as it would be readily appreciated by one having ordinary skill in the art.

The motor's stator unit in this embodiment is characterized in that the insulation sleeve unit 22 is press fit around the shaft tube 11 via at least one buffering member 24. Preferably, the buffering member 24 is arranged between the insulation sleeve unit 22 and the shaft tube 11. Specifically, one buffering member 24 may be arranged between the upper insulation sleeve 22a of the insulation sleeve unit 22 and the shaft tube 11, or between the lower insulation sleeve 22b of the insulation sleeve unit 22 and the shaft tube 11. It is also possible that two buffering members 24 (first and second buffering members 24) are provided, one of which (first buffering member 24) is arranged between the upper insulation sleeve 22a and the shaft tube 11, and the other one of which (second buffering member 24) is arranged between the lower insulation sleeve 22b and the shaft tube 11. In this structure, the insulation sleeve unit 22 may be press fit around the shaft tube 11 via one or more buffering members 24, preventing the stator 2 from disengaging from the shaft tube 11. Furthermore, since the insulation sleeve unit 22 is generally made of plastic material and the buffering member 24 is also made of similar material, such as rubber or other material with the same function (buffering function), it can be ensured that the component of the stator 2 that is press fit around the shaft tube 11 (i.e. the buffering member 24) will not excessively compress the shaft tube 11, thereby preventing the deformation of the shaft tube 11 and providing an improved positioning effect of the stator 2.

The buffering member(s) 24 may be positioned in different manners as described in the following examples.

Figure 6:
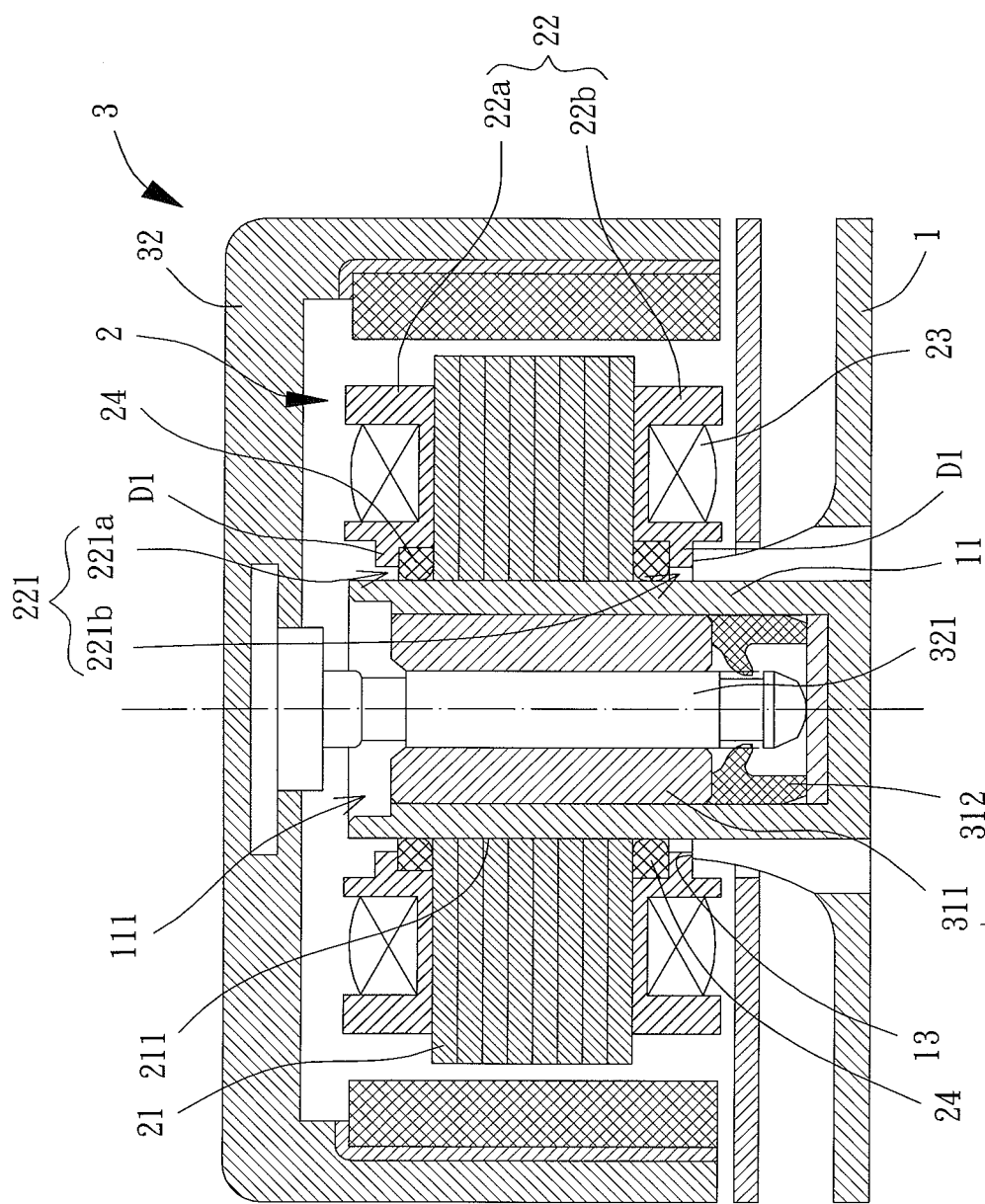
FIG. 6 is a cross-sectional view of the motor equipped with the stator unit with two buffering members fixed in place by two protrusions of the stator unit.

Referring to FIG. 6, one or more buffering members 24 are arranged between the insulation sleeve unit 22 and the silicon steel plate unit 21. Specifically, one buffering member 24 is preferably arranged between the upper insulation sleeve 22a of the insulation sleeve unit 22 and the silicon steel plate unit 21, or between the lower insulation sleeve 22b of the insulation sleeve unit 22 and the silicon steel plate unit 21. It is also possible that two buffering members 24 (first and second buffering members 24) are provided, one of which (first buffering member 24) is arranged between the upper insulation sleeve 22a and the silicon steel plate unit 21, and the other one of which (second buffering member 24) is arranged between the lower insulation sleeve 22b and the silicon steel plate unit 21. In the preferred embodiment, both the upper insulation sleeve 22a and the lower insulation sleeve 22b have a protrusion "D1" radially extending towards the shaft tube 11 in a radial direction, and two buffering members 24 are provided. One buffering member 24 is arranged between the protrusion "D1" of the upper insulation sleeve 22a and the silicon steel plate unit 21, and the other buffering member 24 is arranged between the protrusion "D1" of the lower insulation sleeve 22b and the silicon steel plate unit 21. Each buffering member 24 can be fixed by a respective protrusion "D1", preventing the disengagement of the buffering members 24.

Figure 7:
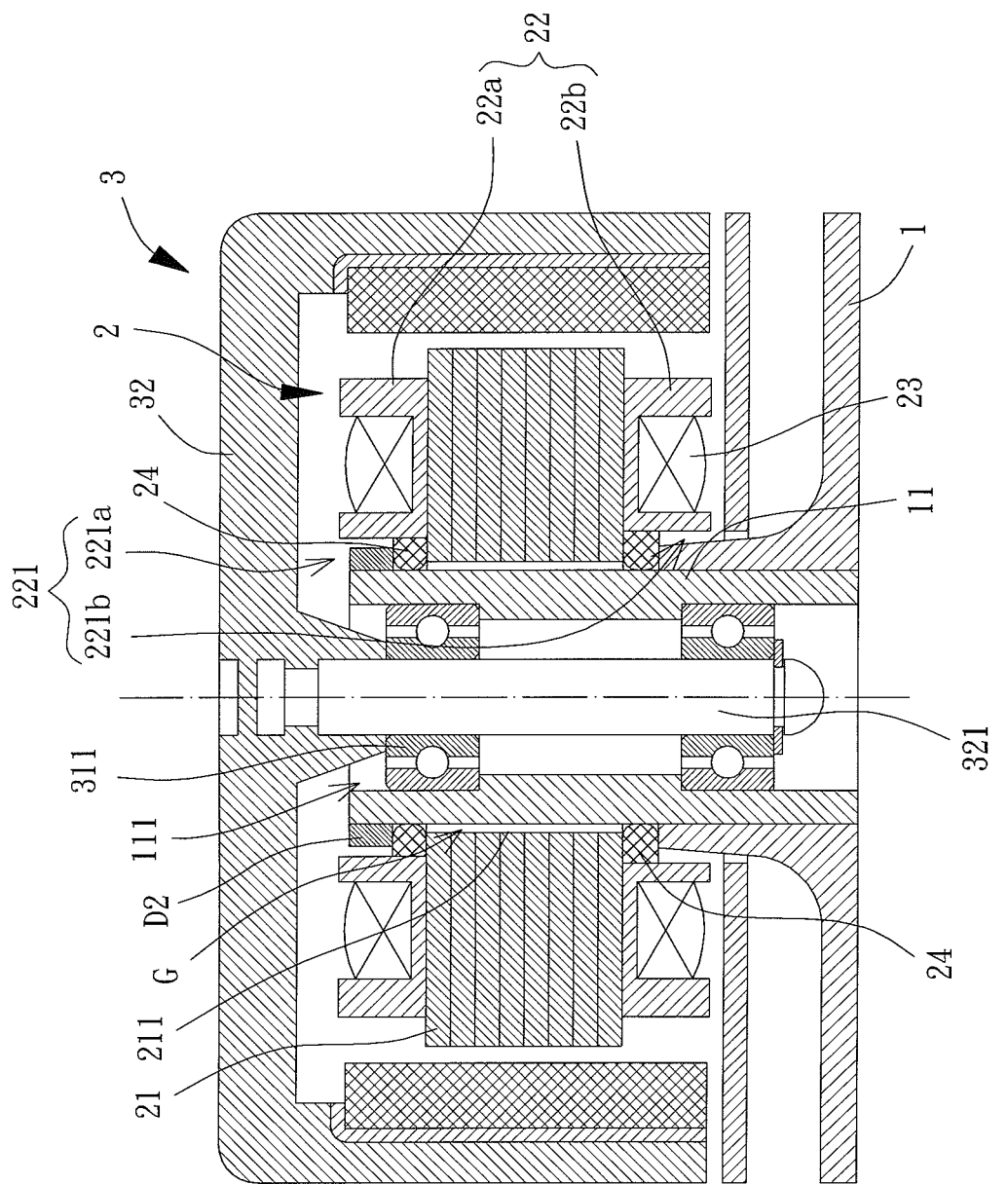
FIG. 7 is a cross-sectional view of the motor equipped with the stator unit with the buffering member fixed in place by a positioning ring.

Referring to FIG. 7, a positioning ring "D2" is coupled with the shaft tube 11. Preferably, the positioning ring "D2" is fit around the shaft tube 11 by press fitting, so that the positioning ring "D2" is able to position the buffering member 24. The buffering member 24 can be sandwiched between the positioning ring "D2" and the silicon steel plate unit 21, so that the positioning ring "D2" is able to fix the buffering member 24 in place, preventing the disengagement of the buffering member 24.

Figure 8:
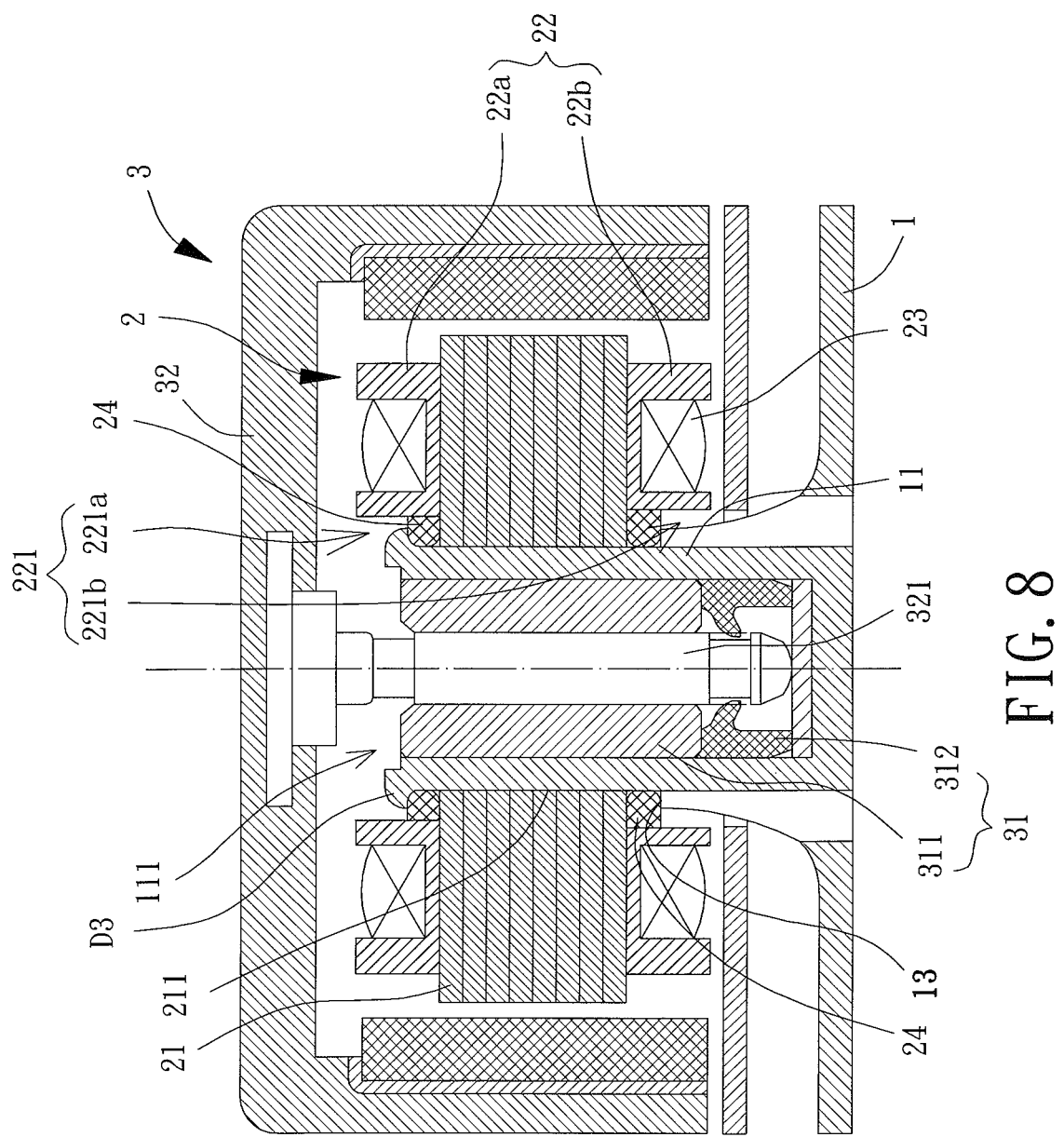
FIG. 8 is a cross-sectional view of the motor equipped with the stator unit with the buffering member fixed in place by an expansion portion of the shaft tube.

Referring to FIG. 8, the shaft tube 11 may form an expansion portion "D3" at the opening end 111 thereof. The expansion portion "D3" is able to position the buffering member 24, to prevent the disengagement of the buffering member 24. The expansion portion "D3" may be formed by shaping the opening end 111 of the shaft tube 11 into an expanded form by ways of thermal melting, stamping, riveting, etc. The expansion portion "D3" is formed after the opening end 111 has been shaped and can be used to position the buffering member 24.

Figure 9:
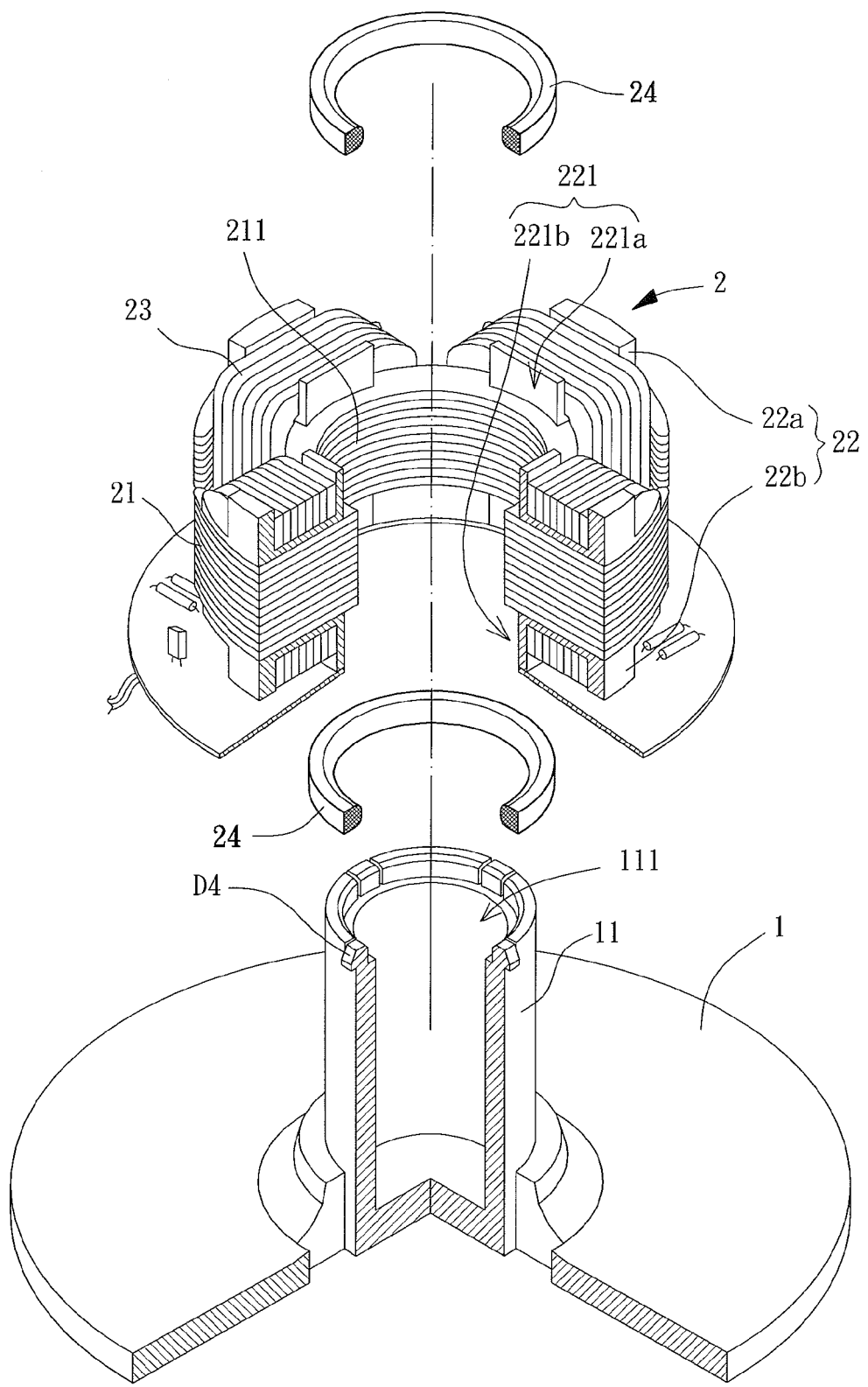
FIG. 9 is an exploded view of another motor's stator unit having an engagement portion according to the preferred embodiment of the invention.
Figure 10:
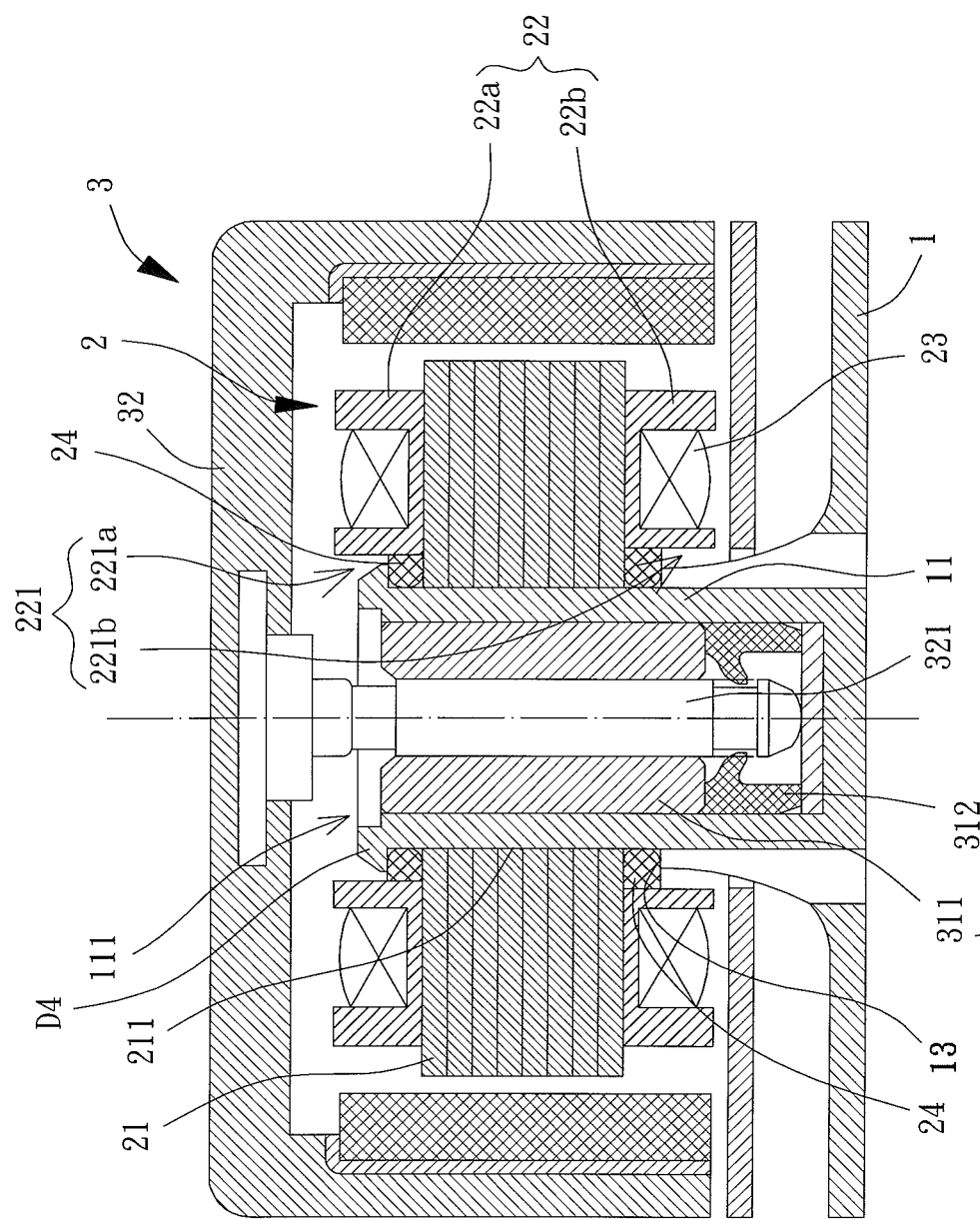
FIG. 10 is a cross-sectional view of a motor equipped with the stator unit shown in FIG. 9.

Referring to FIGS. 9 and 10, the shaft tube 11 preferably includes an engagement portion "D4" at the opening end 111 thereof. The engagement portion "D4" is adapted to be engaged with the buffering member 24. In the embodiment, the engagement portion "D4" is in the form of an engaging protrusion integrally formed on the part of the outer circumferential wall of the shaft tube 11 adjacent to the opening end 111. The engaging protrusion is adapted to position the buffering member 24 of the upper insulation sleeve 22a. This engaging protrusion is able to efficiently prevent the buffering member 24 from disengaging from the shaft tube 11.

The motor's stator unit may be improved by including the following secondary features, as stated below.

Figure 11:
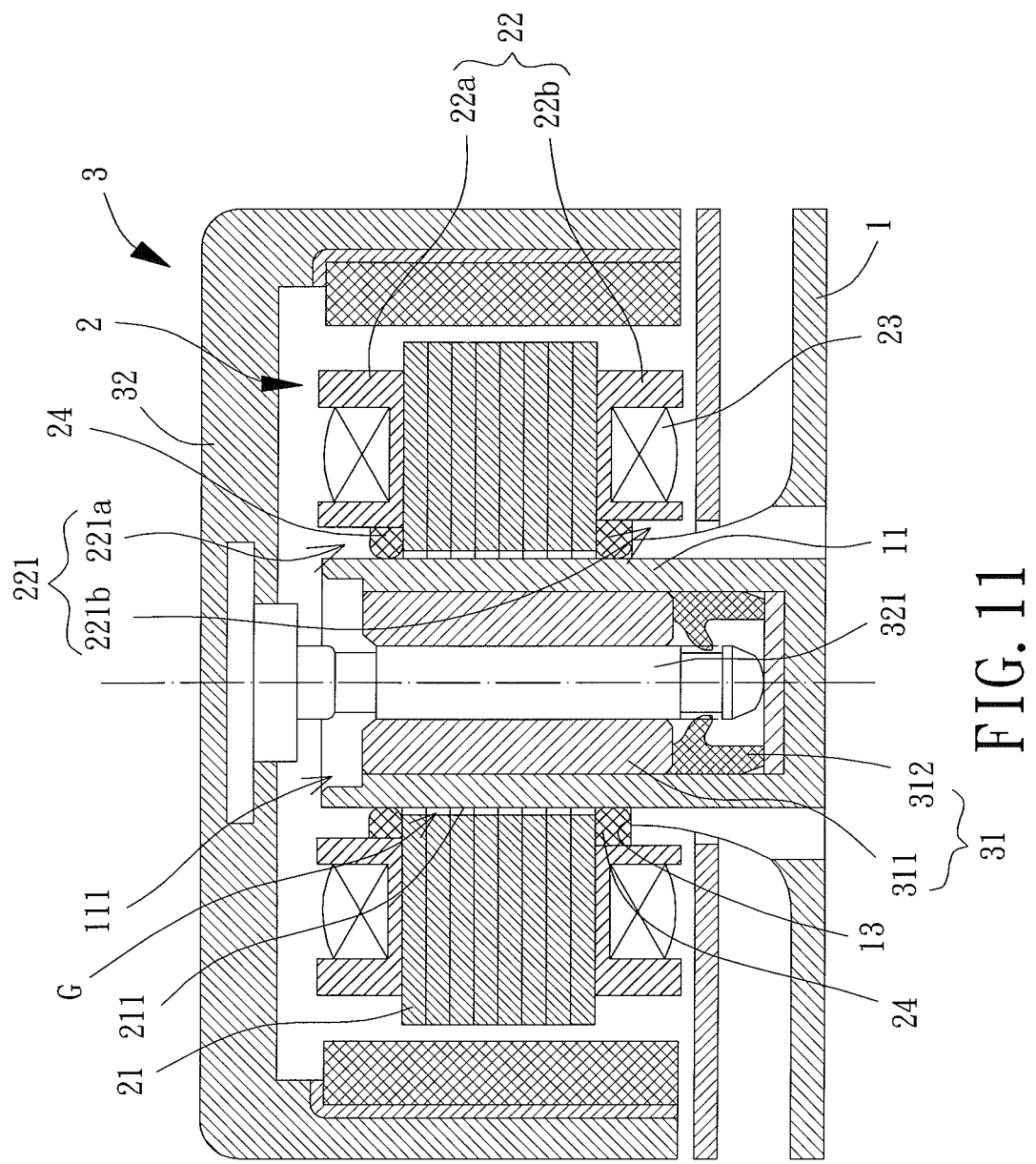
FIG. 11 is a cross-sectional view of a motor equipped with the stator unit with a gap formed between the silicon steel plate unit and the shaft tube.

Referring to FIG. 11, a gap "G" may preferably be formed between the inner circumferential wall of the silicon steel plate unit 21 and the outer circumferential wall of the shaft tube 11. This ensures that the silicon steel plate unit 21 will not make contact with the shaft tube 11, preventing the deformation of the shaft tube 11 resulting from the rigid material (silicon steel plate unit 21) excessively compressing the shaft tube 11. Moreover, when the motor's stator unit is applied to a motor or a cooling fan, the vibration resulting from the contact between the silicon steel plate unit 21 and the shaft tube 11 may be reduced via the gap "G". As a result, noise is reduced and malfunction of the motor resulting from the damaged bearing 311 is prevented.

Figure 12:
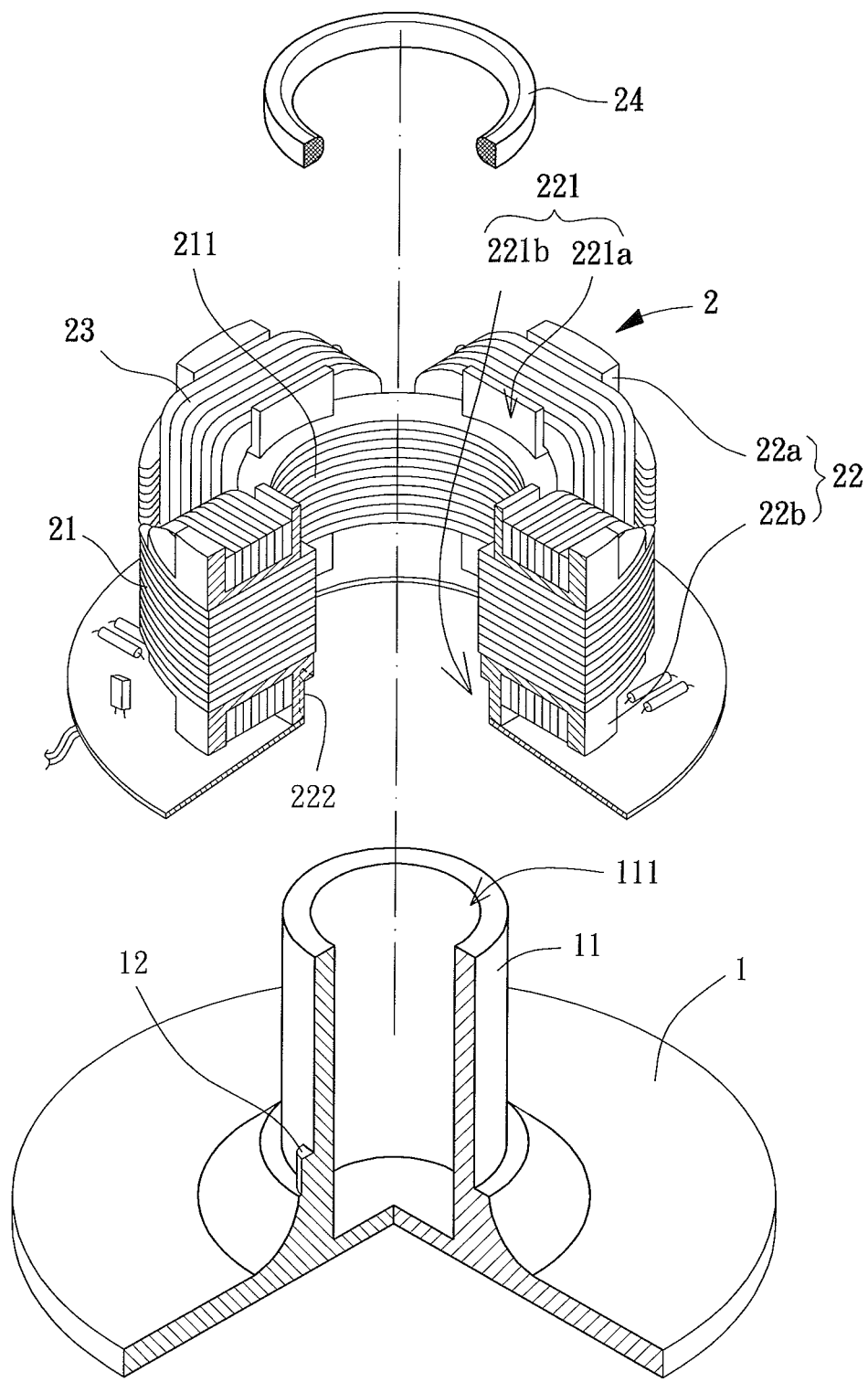
FIG. 12 is an exploded view of another motor's stator unit having a restraining protrusion and a positioning groove according to the preferred embodiment of the invention.

Referring to FIG. 12, a restraining protrusion 12 is preferably formed on the part of the outer circumferential wall of the shaft tube 11 adjacent to the bottom of the shaft tube 11. In addition, a positioning groove 222 is formed on an inner circumferential wall of the lower insulation sleeve 22b. The restraining protrusion 12 may be engaged in the positioning groove 222. When the insulation sleeve unit 22 is fit around the shaft tube 11, the restraining protrusion 12 and the positioning groove 222 can be engaged with each other to prevent the undesired rotation of the stator 2 relative to the shaft tube 11.

Furthermore, referring to FIG. 4, a positioning shoulder 13 is preferably arranged on the outer circumferential wall of the shaft tube 11. The stator 2 may be positioned on the positioning shoulder 13 for an improved positioning effect of the stator 2.

It can be understood from the above description that the insulation sleeve unit 22 may be press fit around the shaft tube 11 via one or more buffering members 24. Based on this, the stator 2 can be securely coupled with the shaft tube 11 using the simple structure without having the shaft tube 11 excessively compressed by the silicon steel plate unit 21 of the stator 2. Thus, convenient assembly is achieved, and deformation of the shaft tube 11 is prevented.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor's stator unit comprising: a base having a shaft tube; and a stator having a silicon steel plate unit, an insulation sleeve unit and a coil unit, wherein the silicon steel plate unit has an inner circumferential wall forming a through-hole, wherein the insulation sleeve unit has an engagement hole, wherein the silicon steel plate unit and the insulation sleeve unit are stacked together, wherein the through-hole and the engagement hole are aligned with each other to allow the shaft tube to extend through the through-hole and the engagement hole, wherein an enameled copper wire is wound around a predetermined part of the insulation sleeve unit to form the coil unit, wherein the insulation sleeve unit of the stator is press fit around an outer circumferential wall of the shaft tube via at least one buffering member, wherein the at least one buffering member is arranged between the insulation sleeve unit and the silicon steel plate unit.

2. The motor's stator unit as claimed in claim 1, wherein the insulation sleeve unit comprises an upper insulation sleeve and a lower insulation sleeve, wherein the silicon steel plate unit is sandwiched between the upper and lower insulation sleeves, and wherein the at least one buffering member includes a single buffering member arranged between the upper insulation sleeve of the insulation sleeve unit and the silicon steel plate unit, or between the lower insulation sleeve of the insulation sleeve unit and the silicon steel plate unit.

3. The motor's stator unit as claimed in claim 2, wherein the insulation sleeve unit comprises an upper insulation sleeve and a lower insulation sleeve, wherein the silicon steel plate unit is sandwiched between the upper and lower insulation sleeves, wherein the at least one buffering member includes first and second buffering members, wherein the first buffering member is arranged between the upper insulation sleeve of the insulation sleeve unit and the silicon steel plate unit, and wherein the second buffering member is between the lower insulation sleeve of the insulation sleeve unit and the silicon steel plate unit.

4. The motor's stator unit as claimed in claim 1, wherein the insulation sleeve unit has at least one protrusion corresponding to the at least one buffering member and extending towards the shaft tube in a radial direction, and wherein each of the at least one buffering member is arranged between a respective one of the at least one protrusion and the silicon steel plate unit.

5. The motor's stator unit as claimed in claim 1, wherein a positioning shoulder is arranged on the outer circumferential wall of the shaft tube, and wherein the stator is positioned on the positioning shoulder.

6. The motor's stator unit as claimed in claim 1, wherein the outer circumferential wall of the shaft tube is spaced from the inner circumferential wall of the silicon steel plate unit by a gap.

7. A motor's stator unit as comprising: a base having a shaft tube; and a stator having a silicon steel plate unit, an insulation sleeve unit and a coil unit, wherein the silicon steel plate unit has an inner circumferential wall forming a through-hole, wherein the insulation sleeve unit has an engagement hole, wherein the silicon steel plate unit and the insulation sleeve unit are stacked together, wherein the through-hole and the engagement hole are aligned with each other to allow the shaft tube to extend through the through-hole and the engagement hole, wherein an enameled copper wire is wound around a predetermined part of the insulation sleeve unit to form the coil unit, wherein the insulation sleeve unit of the stator is press fit around an outer circumferential wall of the shaft tube via at least one buffering member, wherein the at least one buffering member is arranged between the insulation sleeve unit and the shaft tube, wherein the insulation sleeve unit comprises an upper insulation sleeve and a lower insulation sleeve, wherein the silicon steel plate unit is sandwiched between the upper and lower insulation sleeves, wherein the at least one buffering member includes first and second buffering members, wherein the first buffering member is arranged between the upper insulation sleeve of the insulation sleeve unit and the shaft tube, and wherein the second buffering member is between the lower insulation sleeve of the insulation sleeve unit and the shaft tube.

8. The motor's stator unit as claimed in claim 7, wherein a positioning shoulder is arranged on the outer circumferential wall of the shaft tube, and wherein the stator is positioned on the positioning shoulder.

9. The motor's stator unit as claimed in claim 8, wherein the lower insulation sleeve of the insulation sleeve unit is positioned on the positioning shoulder.

10. The motor's stator unit as claimed in claim 7, wherein the outer circumferential wall of the shaft tube is spaced from the inner circumferential wall of the silicon steel plate unit by a gap.

11. A motor's stator unit comprising: a base having a shaft tube; and a stator having a silicon steel plate unit, an insulation sleeve unit and a coil unit, wherein the silicon steel plate unit has an inner circumferential wall forming a through-hole, wherein the insulation sleeve unit has an engagement hole, wherein the silicon steel plate unit and the insulation sleeve unit are stacked together, wherein the through-hole and the engagement hole are aligned with each other to allow the shaft tube to extend through the through-hole and the engagement hole, wherein an enameled copper wire is wound around a predetermined part of the insulation sleeve unit to form the coil unit, wherein the insulation sleeve unit of the stator is press fit around an outer circumferential wall of the shaft tube via at least one buffering member, wherein the shaft tube is coupled with a positioning ring positioning one of the at least one buffering member, and wherein the one of the at least one buffering member is sandwiched between the positioning ring and the silicon steel plate unit.

12. The motor's stator unit as claimed in claim 11, wherein the positioning ring is fit around the shaft tube by press fitting.

13. The motor's stator unit as claimed in claim 11, wherein the outer circumferential wall of the shaft tube is spaced from the inner circumferential wall of the silicon steel plate unit by a gap.

14. A motor's stator unit comprising: a base having a shaft tube; and a stator having a silicon steel plate unit, an insulation sleeve unit and a coil unit, wherein the silicon steel plate unit has an inner circumferential wall forming a through-hole, wherein the insulation sleeve unit has an engagement hole, wherein the silicon steel plate unit and the insulation sleeve unit are stacked together, wherein the through-hole and the engagement hole are aligned with each other to allow the shaft tube to extend through the through-hole and the engagement hole, wherein an enameled copper wire is wound around a predetermined part of the insulation sleeve unit to form the coil unit, wherein the insulation sleeve unit of the stator is press fit around an outer circumferential wall of the shaft tube via at least one buffering member, wherein the shaft tube has an opening end, wherein the shaft tube forms an expansion portion at the opening end thereof, and wherein the expansion portion positions one of the at least one buffering member.

15. The motor's stator unit as claimed in claim 14, wherein the outer circumferential wall of the shaft tube is spaced from the inner circumferential wall of the silicon steel plate unit by a gap.

16. A motor's stator unit comprising: a base having a shaft tube; and a stator having a silicon steel plate unit, an insulation sleeve unit and a coil unit, wherein the silicon steel plate unit has an inner circumferential wall forming a through-hole, wherein the insulation sleeve unit has an engagement hole, wherein the silicon steel plate unit and the insulation sleeve unit are stacked together, wherein the through-hole and the engagement hole are aligned with each other to allow the shaft tube to extend through the through-hole and the engagement hole, wherein an enameled copper wire is wound around a predetermined part of the insulation sleeve unit to form the coil unit, wherein the insulation sleeve unit of the stator is press fit around an outer circumferential wall of the shaft tube via at least one buffering member, wherein the shaft tube has an opening end, wherein the shaft tube comprises an engagement portion at the opening end thereof, and wherein the engagement portion is engaged with one of the at least one buffering member.

17. The motor's stator unit as claimed in claim 12, wherein the engagement portion is in the form of an engaging protrusion integrally formed at the opening end of the shaft tube, and wherein the engaging protrusion positions the one of the at least one buffering member.

18. The motor's stator unit as claimed in claim 16, wherein the outer circumferential wall of the shaft tube is spaced from the inner circumferential wall of the silicon steel plate unit by a gap.

19. A motor's stator unit comprising: a base having a shaft tube; and a stator having a silicon steel plate unit, an insulation sleeve unit and a coil unit, wherein the silicon steel plate unit has an inner circumferential wall forming a through-hole, wherein the insulation sleeve unit has an engagement hole, wherein the silicon steel plate unit and the insulation sleeve unit are stacked together, wherein the through-hole and the engagement hole are aligned with each other to allow the shaft tube to extend through the through-hole and the engagement hole, wherein an enameled copper wire is wound around a predetermined part of the insulation sleeve unit to form the coil unit, wherein the insulation sleeve unit of the stator is press fit around an outer circumferential wall of the shaft tube via at least one buffering member, wherein the insulation sleeve unit comprises an upper insulation sleeve and a lower insulation sleeve, wherein the silicon steel plate unit is sandwiched between the upper and lower insulation sleeves, wherein a restraining protrusion is formed on the outer circumferential wall of the shaft tube, wherein a positioning groove is formed on an inner circumferential wall of the lower insulation sleeve, and wherein the restraining protrusion is engaged in the positioning groove.

20. The motor's stator unit as claimed in claim 19, wherein the outer circumferential wall of the shaft tube is spaced from the inner circumferential wall of the silicon steel plate unit by a gap.

* * * * *